(12) United States Patent
Morioka et al.

(10) Patent No.: US 8,379,155 B2
(45) Date of Patent: *Feb. 19, 2013

(54) OPERATION TERMINAL COMMUNICATING WITH AN INFORMATION PROCESSING APPARATUS USING ELECTRIC POWER OF THE INFORMATION PROCESSING APPARATUS

(75) Inventors: Yuichi Morioka, Tokyo (JP); Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 314 days.

This patent is subject to a terminal disclaimer.

(21) Appl. No.: 12/840,781

(22) Filed: Jul. 21, 2010

(65) Prior Publication Data

US 2011/0025921 A1 Feb. 3, 2011

(30) Foreign Application Priority Data

Jul. 31, 2009 (JP) ................................. 2009-179365

(51) Int. Cl.
*H04N 17/00* (2006.01)
(52) U.S. Cl. ........................................................ 348/730
(58) Field of Classification Search .................. 348/730, 348/552, 553, 725, 723, 724; 318/315, 312; 340/539.1, 12.5, 12.51, 13.24–13.26, 10.1–10.3
See application file for complete search history.

(56) References Cited

U.S. PATENT DOCUMENTS

| | | | | |
|---|---|---|---|---|
| 6,531,964 B1* | 3/2003 | Loving | ........................ | 340/12.51 |
| 7,071,825 B2* | 7/2006 | VoBa | ........................ | 340/572.1 |
| 7,639,828 B2* | 12/2009 | Platz | ........................ | 381/315 |
| 8,082,556 B1* | 12/2011 | Aiouaz et al. | ................. | 719/328 |
| 2003/0030465 A1* | 2/2003 | Robins et al. | ................. | 324/771 |
| 2004/0070491 A1* | 4/2004 | Huang et al. | ................. | 340/10.5 |
| 2005/0087235 A1* | 4/2005 | Skorpik et al. | ................ | 137/554 |
| 2007/0057781 A1* | 3/2007 | Breed | ......................... | 340/457.1 |
| 2007/0194945 A1* | 8/2007 | Atkinson | ................. | 340/825.72 |
| 2009/0058361 A1* | 3/2009 | John | ............................. | 320/128 |
| 2009/0085762 A1* | 4/2009 | Yuki et al. | ................... | 340/691.6 |
| 2009/0234981 A1* | 9/2009 | Umeda et al. | ................... | 710/18 |
| 2010/0182160 A1* | 7/2010 | Lu | ............................ | 340/825.69 |
| 2011/0025543 A1* | 2/2011 | Takano et al. | ................. | 341/176 |
| 2011/0068909 A1* | 3/2011 | Chang | ........................ | 340/12.51 |
| 2012/0007441 A1* | 1/2012 | John | ............................. | 307/104 |

FOREIGN PATENT DOCUMENTS

JP 2002-157562 5/2002

* cited by examiner

*Primary Examiner* — Paulos M Natnael
(74) *Attorney, Agent, or Firm* — Sony Corporation

(57) ABSTRACT

There is provided an information processing apparatus including a reception section for receiving a trigger packet, which is a packet smaller than a command packet including a command for designating processing to be executed by the information processing apparatus, from an operation terminal via a wireless signal, a trigger packet acquisition section for acquiring the trigger packet from the wireless signal received by the reception section, an electric power-supply packet generation section for generating an electric power-supply packet for supplying electric power, when the trigger packet is acquired by the trigger packet acquisition section, and a transmission section for transmitting the electric power-supply packet generated by the electric power-supply packet generation section to the operation terminal via a wireless signal.

17 Claims, 8 Drawing Sheets

US 8,379,155 B2

OPERATION TERMINAL COMMUNICATING WITH AN INFORMATION PROCESSING APPARATUS USING ELECTRIC POWER OF THE INFORMATION PROCESSING APPARATUS

BACKGROUND OF THE INVENTION

1. Field of the Invention

The present invention relates to an information processing apparatus, an operation terminal, an information processing system, and an information processing method performed by the information processing system.

2. Description of the Related Art

There has been widely used a remote control utilizing infrared data communication as a remote control for an information processing apparatus such as a TV set. However, in the case of using the remote control utilizing infrared data communication, it is necessary to direct the light-emitting part of the infrared light on the remote control toward the information processing apparatus, because the directivity of the infrared light is strong. Since the directivity of radio waves is relatively weak, an RF (Radio Frequency) remote control using a radio wave has recently been developed, and has become a mainstream. Further, attempts to standardize the RF remote control are conducted by each organization.

For example, in accordance with near field communication standard IEEE (registered trademark) (Institute of Electrical and Electronic Engineers) 802.15.4, ZigBee (registered trademark) is standardized as specifications for a network layer, a security layer, and an application layer which correspond to upper layer of IEEE (registered trademark) 802.15.4. The specification of ZigBee (registered trademark) is approved by ZigBee (registered trademark) Alliance as version 1.0. IEEE (registered trademark) 802.15.4 is completed at Standardization Committee of IEEE (registered trademark) as specifications for a physical layer and a MAC (Media Access Control) layer.

In addition, based on IEEE (registered trademark) 802.15.4, RF remote control standard ZigBee (registered trademark) RF4CE (Radio Frequency for Consumer Electronics) v1.0 spec is standardized by trade organizations.

Here, generally in powerless communication technologies used for RFID (Radio Frequency IDentification) and the like, a card without power source is irradiated with a radio wave which is emitted from a reader having abundant power source. The card acquires electric power from the irradiated radio wave, and replies to the reader by using the acquired electric power. The reader follows procedures of acquiring the information replied by the card and then reading the information of the card (for example, refer to Japanese Patent Application Laid-Open No. 2002-157562).

SUMMARY OF THE INVENTION

However, in the case of using the powerless communication technology described above, it is difficult for the reader to grasp beforehand the timing at which the card comes closer to a communicable area. Further, in the case of applying the powerless communication technology to the communication between an operation terminal without power source such as an RF remote control and an information processing apparatus with power source, it is difficult for the information processing apparatus to grasp beforehand the timing at which the operation terminal is operated, that is, the timing at which a communication is required from the operation terminal to the information processing apparatus. Therefore, there was an issue that it was necessary for the information processing apparatus to irradiate the operation terminal with a radio wave even at the timing when a communication is not required from the operation terminal to the information processing apparatus, and hence, the utilization efficiency of the electric power which the information processing apparatus has was low.

In light of the foregoing, it is desirable to provide a novel and improved technology which is capable of, when the operation terminal performs communication by using electric power that the information processing apparatus has, enhancing the utilization efficiency of the electric power.

According to an embodiment of the present invention, there is provided an information processing apparatus which includes a reception section for receiving a trigger packet, which is a packet smaller than a command packet including a command for designating processing to be executed by the information processing apparatus, from an operation terminal via a wireless signal, a trigger packet acquisition section for acquiring the trigger packet from the wireless signal received by the reception section, an electric power-supply packet generation section for generating an electric power-supply packet for supplying electric power, when the trigger packet is acquired by the trigger packet acquisition section, and a transmission section for transmitting the electric power-supply packet generated by the electric power-supply packet generation section to the operation terminal via a wireless signal.

The information processing apparatus may further include a trigger packet reception-notification section for generating a trigger packet reception-notification packet for indicating that the trigger packet is received, when the trigger packet is acquired by the trigger packet acquisition section. The transmission section may further transmit the trigger packet reception-notification packet generated by the trigger packet reception-notification section to the operation terminal via a wireless signal.

The electric power-supply packet generation section may sequentially generate a predetermined number of the electric power-supply packets, and the transmission section may sequentially transmit the predetermined number of the electric power-supply packets generated by the electric power-supply packet generation section to the operation terminal via a wireless signal.

The information processing apparatus may further include an electric power-supply stop request packet-acquisition section. The reception section may further receive an electric power-supply stop request packet for indicating that the transmission of the electric power-supply packet is to be stopped from the operation terminal via a wireless signal, the electric power-supply stop request packet-acquisition section may acquire the electric power-supply stop request packet from the wireless signal received by the reception section, the electric power-supply packet generation section may sequentially generate a plurality of the electric power-supply packets until the electric power-supply stop request packet is acquired by the electric power-supply stop request packet-acquisition section, and the transmission section may sequentially transmit the plurality of the electric power-supply packets generated by the electric power-supply packet generation section to the operation terminal via a wireless signal.

The information processing apparatus may further include a command packet acquisition section. The reception section may further receive the command packet transmitted from the operation terminal by using electric power acquired from the electric power-supply packet, the command packet acquisition section may acquire the command packet from the wireless signal received by the reception section, the electric power-supply packet generation section may sequentially generate a plurality of the electric power-supply packets until the command packet is acquired by the command packet acquisition section, and the transmission section may sequentially transmit the plurality of the electric power-supply packets generated by the electric power-supply packet generation section to the operation terminal via a wireless signal.

The information processing apparatus may further include a command packet acquisition section and a processing execution section. The reception section may further receive the command packet transmitted from the operation terminal by using electric power acquired from the electric power-supply packet, the command packet acquisition section may acquire the command packet from the wireless signal received by the reception section, and the processing execution section may execute processing designated by a command included in the command packet acquired by the command packet acquisition section.

The information processing apparatus may further include an electric power-supply determination section for determining whether electric power-resupply request information for indicating retransmission of the electric power-supply packet is added to the command packet acquired by the command packet acquisition section. When it is determined by the electric power-supply determination section that the electric power-resupply request information is added to the command packet, the electric power-supply packet generation section may re-generate the electric power-supply packet, and the transmission section may retransmit the electric power-supply packet generated by the electric power-supply packet generation section to the operation terminal via a wireless signal.

The information processing apparatus may further include a storage section and an electric power-supply determination section for determining whether electric power-resupply request information for indicating retransmission of the electric power-supply packet is added to the command packet acquired by the command packet acquisition section. When it is determined by the electric power-supply determination section that the electric power-resupply request information is added to the command packet, the electric power-supply packet generation section may re-generate the electric power-supply packet, the transmission section may retransmit the electric power-supply packet generated by the electric power-supply packet generation section to the operation terminal via a wireless signal, and, when it is determined by the electric power-supply determination section that the electric power-resupply request information is added to the command packet, the processing execution section may cause the command included in the command packet acquired by the command packet acquisition section to be stored into the storage section, and when it is determined by the electric power-supply determination section that the electric power-resupply request information is not added to the command packet, the processing execution section may combine an Nth command (N represents an integer of 2 or more) included in the command packet acquired by the command packet acquisition section with a first command to an N−1th command stored in the storage section and may execute processing designated by the obtained command.

According to the embodiments of the present invention described above, when the operation terminal performs communication by using electric power which the information processing apparatus has, it is possible to enhance the utilization efficiency of the electric power.

DETAILED DESCRIPTION OF THE EMBODIMENTS

Figure 1:
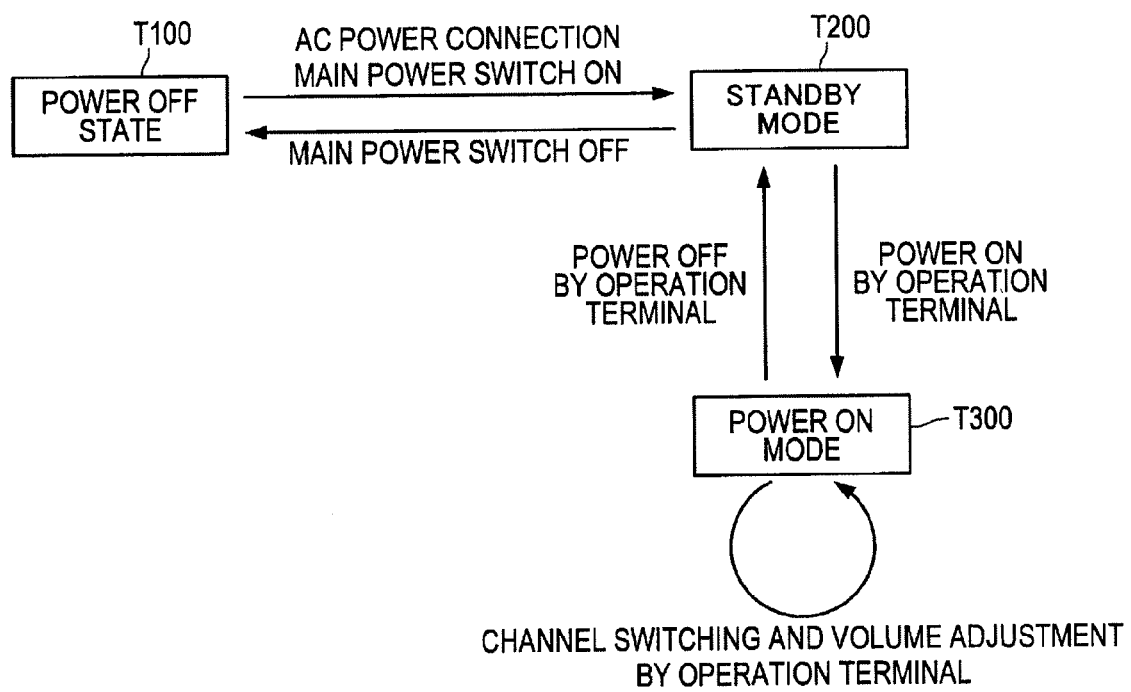
FIG. 1 is a state transition diagram of a TV set as an example of an information processing apparatus according to a present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Note that the description is given in the following order.
1. First embodiment
  1-1. State transition of TV set as example of information processing apparatus
  1-2. Outline of information processing system
  1-3. Functional configuration of information processing apparatus
  1-4. Functional configuration of operation terminal
  1-5. Hardware configuration of information processing apparatus
  1-6. Hardware configuration of operation terminal
  1-7. Flow of processing executed by information processing system
  1-8. Flow of processing for acquiring electric power for transmitting trigger packet
2. Modified example
3. Summary 1. First Embodiment Hereinafter, a first embodiment of the present invention will be described.
[1-1. State Transition of TV Set as Example of Information Processing Apparatus]

FIG. 1 is a state transition diagram of a TV set as an example of an information processing apparatus according to a present embodiment. With reference to FIG. 1 (refer to other figures as appropriate), a state transition of the TV set as an example of the information processing apparatus according to the present embodiment will be described.

In FIG. 1, as main functions of an operation terminal such as a remote control, there are exemplified a switching between ON and OFF of the power and a selection of channels of the TV. As shown in FIG. 1, for example, when a power ON switch of the operation terminal is held down by a user, the operation terminal transmits a power ON signal, and when the TV receives the power ON signal, the state of the TV transits from a standby mode T200 to a power ON mode T300. In the case where the state of the TV is the power ON mode T300 and when the TV receives a channel selection signal from the operation terminal, the channel of the TV is switched based on the received selection signal. In the same manner, in the case where the state of the TV is the power ON mode T300 and when the TV receives a volume selection signal from the operation terminal, the volume is controlled based on the received selection signal.

In the case where the state of the TV is one of the standby mode T200 and the power ON mode T300, the TV is capable of receiving a command using a wireless signal from the operation terminal. In the case where the state of the TV is the standby mode T200, it is preferred that the TV reduce the electric power used for receiving a radio wave to an extent that the electric power is smaller than that in the case of the power ON mode T300. This is because there is a demand for reducing the amount of electric power consumed in the case of the state of the TV being the standby mode T200. Accordingly, in the case where the state of the TV is the standby mode T200, it is preferred that the TV intermittently transit to a reception waiting state, which is a state that is capable of receiving a radio wave, to thereby reduce the electric power consumption. Further, the above is applied not only to the TV, and it is preferred that an information processing apparatus which performs processing in accordance with the radio wave received from the operation terminal, in general, intermittently transit to the reception waiting state, to thereby reduce the electric power consumption.

[1-2. Outline of Information Processing System]

Figure 2:
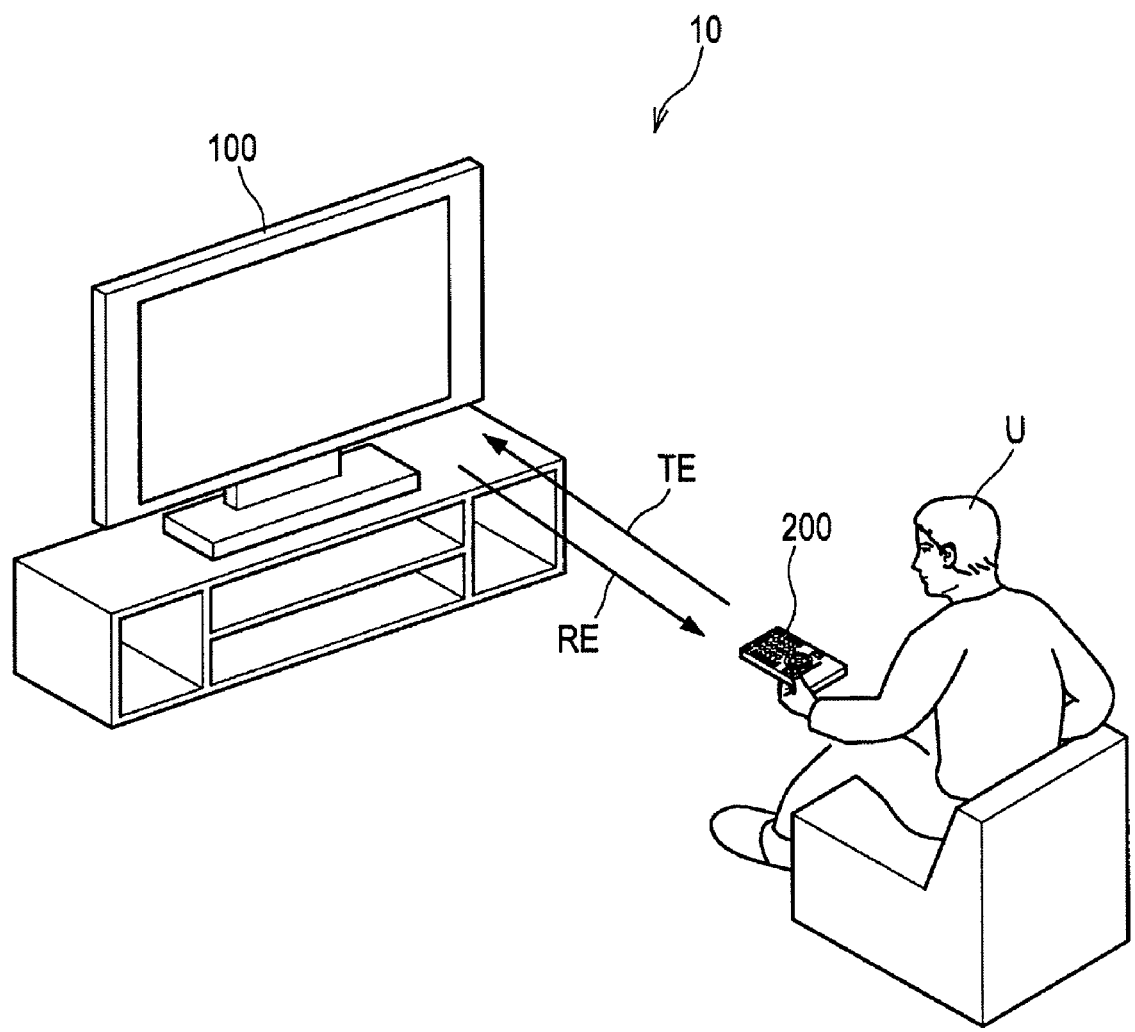
FIG. 2 is a diagram for illustrating an outline of an information processing system according to the present embodiment.

FIG. 2 is a diagram for illustrating an outline of an information processing system according to the present embodiment. With reference to FIG. 2 (refer to other figures as appropriate), the outline of the information processing system according to the present embodiment will be described.

As shown in FIG. 2, an information processing system 10 according to the present embodiment includes an information processing apparatus 100 and an operation terminal 200. When accepting input of operation information from a user U, the operation terminal 200 transmits a trigger packet, which is a packet smaller than a command packet to be described later, to the information processing apparatus 100 via a wireless signal TE using a radio wave. When receiving the trigger packet from the operation terminal 200, the information processing apparatus 100 transmits an electric power-supply packet for supplying electric power to the operation terminal 200 via a wireless signal RE using a radio wave.

When receiving the electric power-supply packet from the information processing apparatus 100, the operation terminal 200 acquires electric power from the received electric power-supply packet and transmits a command packet, which includes a command included in the operation information, to the information processing apparatus 100 via the wireless signal TE, by using the acquired electric power. The information processing apparatus 100 receives the command packet from the operation terminal 200 and performs processing in accordance with the command included in the received command packet.

Here, as shown in FIG. 2, it can be assumed that the information processing apparatus 100 is, for example, the TV set, but the information processing apparatus 100 is not limited to the TV set. The information processing apparatus 100 may be any as long as it has a function of transmitting the electric power-supply packet to the operation terminal 200 via the wireless signal RE or a function of receiving the command packet from the operation terminal 200 via the wireless signal TE and performing processing in accordance with the command included in the received command packet. The information processing apparatus 100 may be, for example, a recording/reproducing apparatus for a TV program.

Further, it can be assumed that the operation terminal 200 is, for example, the RF remote control as described above, but the operation terminal 200 is not particularly limited to the RF remote control. The operation terminal 200 may be any as long as it has, for example, a function of accepting the input of the operation information from the user U, a function of acquiring the electric power from the electric power-supply packet received from the information processing apparatus 100 via the wireless signal RE, or a function of transmitting the command packet, which includes a command included in the operation information, to the information processing apparatus 100 via the wireless signal TE.

[1-3. Functional Configuration of Information Processing Apparatus]

Figure 3:
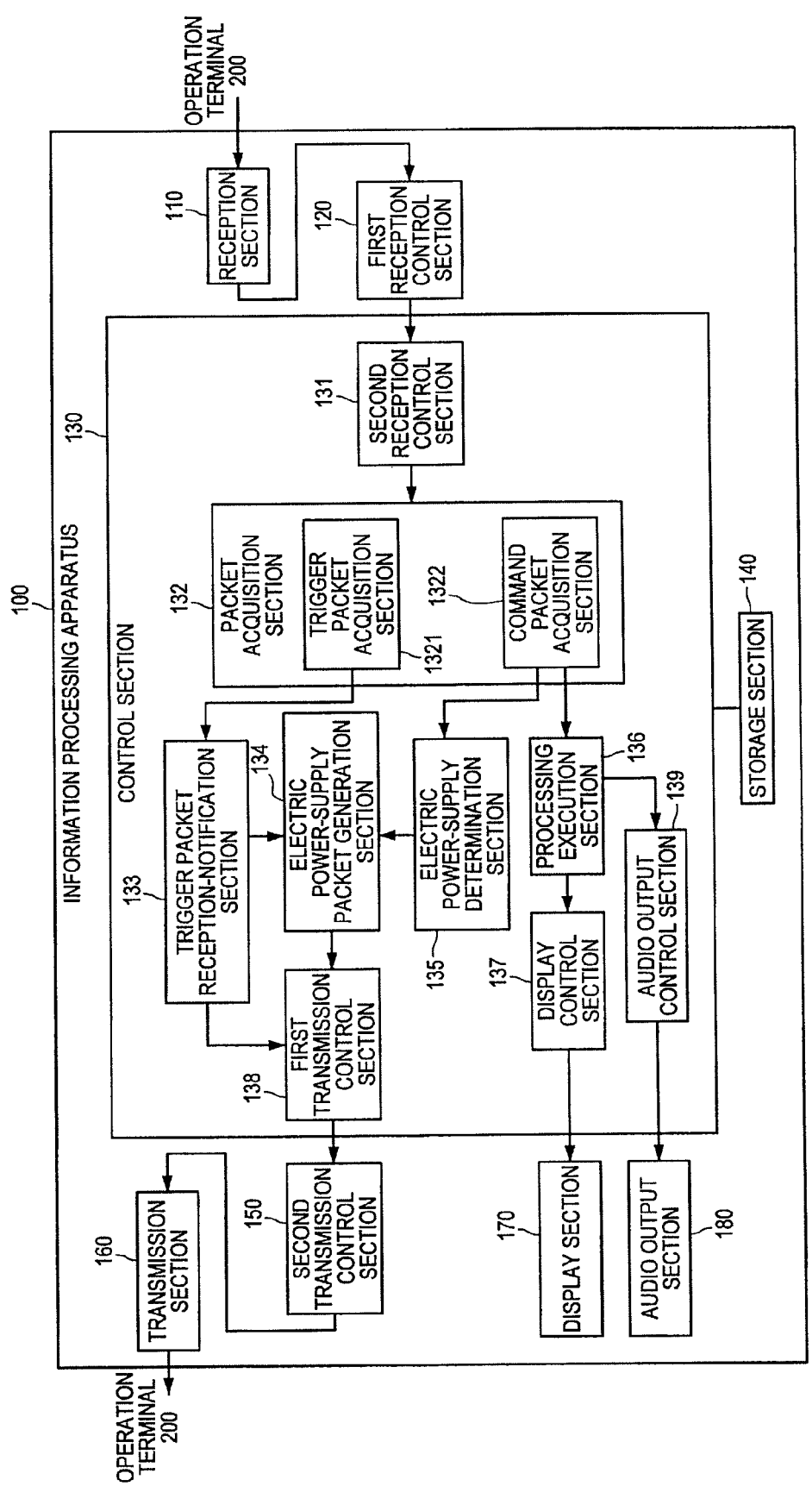
FIG. 3 is a diagram showing a functional configuration of the information processing apparatus according to the present embodiment.

FIG. 3 is a diagram showing a functional configuration of the information processing apparatus according to the present embodiment. With reference to FIG. 3 (refer to other figures as appropriate), the functional configuration of the information processing apparatus according to the present embodiment will be described.

As shown in FIG. 3, the information processing apparatus 100 includes at least a reception section 110, a control section 130, and a transmission section 160. Further, the control section 130 includes at least a packet acquisition section 132 and an electric power-supply packet generation section 134.

The reception section 110 includes an antenna and the like, and has a function of receiving a trigger packet, which is a packet smaller than a command packet including a command for designating processing to be executed by the information processing apparatus 100, from the operation terminal 200 via a wireless signal. The trigger packet may be any as long as it is an extremely small packet, and may include only a preamble, for example.

The information processing apparatus 100 includes a first reception control section 120 as necessary. The first reception control section 120 performs, with respect to the wireless signal received by the reception section 110, analog processing such as amplification, filtering, and downconversion as necessary, to thereby perform frequency conversion in a manner that a high-frequency signal is converted into a baseband signal. Further, in the case where the control section 130 performs processing using a digital signal, the first reception control section 120 converts an analog-type baseband signal into a digital-type baseband signal.

The control section 130 includes a second reception control section 131 as necessary. The second reception control section 131 has a function of performing demodulation processing, decoding processing, and the like with respect to the baseband signal. The demodulation processing and the decoding processing are not particularly limited.

A trigger packet acquisition section 1321 has a function of acquiring the trigger packet from the wireless signal received by the reception section 110. For example, in the case where packet identification information for identifying a trigger packet is imparted to a packet acquired from the wireless signal received by the reception section 110, the packet acquisition section 132 regards the packet as the trigger packet and outputs the packet to the trigger packet acquisition section 1321.

The electric power-supply packet generation section 134 has a function of, when the trigger packet is acquired by the trigger packet acquisition section 1321, generating an electric power-supply packet for supplying electric power. The size of the electric power-supply packet is not particularly limited, and can be appropriately adjusted in accordance with the electric power to be supplied to the operation terminal 200 in transmission of one packet. Further, the electric power-supply packet is used to supply the electric power to the operation terminal 200, and hence, information included in the electric power-supply packet is not particularly limited.

The transmission section 160 includes an antenna and the like, and has a function of transmitting the electric power-supply packet generated by the electric power-supply packet generation section 134 to the operation terminal 200 via a wireless signal. The transmission section 160 may have a configuration in which the same antenna is shared with the reception section 110 or may have a configuration which has different antenna from that included in the reception section 110.

The control section 130 includes a first transmission control section 138 as necessary. The first transmission control section 138 has a function of performing modulation processing, encoding processing, and the like with respect to the baseband signal. The modulation processing and the encoding processing are not particularly limited.

The information processing apparatus 100 includes a second transmission control section 150 as necessary. In the case where the control section 130 performs processing using a digital signal, the second transmission control section 150 converts the digital signal to be transmitted into an analog signal. Further, the second transmission control section 150 performs frequency conversion in a manner that the baseband signal is converted into a high-frequency signal by upconversion and outputs the signal to the transmission section 160.

The control section 130 may further include a trigger packet reception-notification section 133. The trigger packet reception-notification section 133 has a function of, when the trigger packet is acquired by the trigger packet acquisition section 1321, generating a trigger packet reception-notification packet for indicating that the trigger packet is received. In the case where the control section 130 further includes the trigger packet reception-notification section 133, the transmission section 160 further transmits the trigger packet reception-notification packet generated by the trigger packet reception-notification section 133 to the operation terminal 200 via a wireless signal. When receiving the trigger packet reception-notification packet from the information processing apparatus 100, the operation terminal 200 can recognize that the trigger packet is received by the information processing apparatus 100 and can stop transmitting the trigger packet.

There are various techniques which can be employed as a technique for the information processing apparatus 100 to stop transmitting the electric power-supply packet. For example, as a first technique, there can be employed a technique in which the electric power-supply packet generation section 134 sequentially generates a predetermined number of the electric power-supply packets, and the transmission section 160 sequentially transmits the predetermined number of the electric power-supply packets generated by the electric power-supply packet generation section 134 to the operation terminal 200 via a wireless signal.

As a second technique, there can be employed a technique in which the information processing apparatus 100 further includes an electric power-supply stop request packet-acquisition section. In that case, the reception section 110 further receives an electric power-supply stop request packet for indicating that the transmission of the electric power-supply packet is to be stopped from the operation terminal 200 via a wireless signal, and the electric power-supply stop request packet-acquisition section acquires the electric power-supply stop request packet from the wireless signal received by the reception section 110. Then, the electric power-supply packet generation section 134 may sequentially generate a plurality of the electric power-supply packets until the electric power-supply stop request packet is acquired by the electric power-supply stop request packet-acquisition section, and the transmission section 160 may sequentially transmit the electric power-supply packets generated by the electric power-supply packet generation section 134 to the operation terminal 200 via a wireless signal.

Further, as a third technique, there can be employed a technique in which the information processing apparatus 100 transmits an electric power-supply packet until the information processing apparatus 100 acquires a command packet from the operation terminal 200. In that case, the information processing apparatus 100 further includes a command packet acquisition section 1322, and the reception section 110 further receives the command packet transmitted from the operation terminal 200 by using electric power acquired from the electric power-supply packet. The command packet acquisition section 1322 acquires the command packet from the wireless signal received by the reception section 110. The electric power-supply packet generation section 134 sequentially generates a plurality of the electric power-supply packets until the command packet is acquired by the command packet acquisition section 1322, and the transmission section 160 sequentially transmits the electric power-supply packets generated by the electric power-supply packet generation section 134 to the operation terminal 200 via a wireless signal.

The information processing apparatus 100 may further include the command packet acquisition section 1322 and a processing execution section 136. In that case, the reception section 110 further receives the command packet transmitted from the operation terminal 200 by using electric power acquired from the electric power-supply packet, and the command packet acquisition section 1322 acquires the command packet from the wireless signal received by the reception section 110. Then, the processing execution section 136 executes processing designated by a command included in the command packet acquired by the command packet acquisition section 1322. For example, in the case where packet identification information for identifying a command packet is imparted to a packet acquired from the wireless signal received by the reception section 110, the packet acquisition section 132 regards the packet as the command packet and outputs the packet to the command packet acquisition section 1322.

Further, there can be considered a case where the operation terminal 200 continuously transmits a plurality of command packets to the information processing apparatus 100. For example, the case where the operation terminal 200 continuously transmits a command to turn up a volume a plurality of times to the information processing apparatus 100 corresponds to such a case. In that case, the information processing apparatus 100 may further include an electric power-supply determination section 135. The electric power-supply determination section 135 determines whether electric power-resupply request information for indicating retransmission of the electric power-supply packet is added to the command packet acquired by the command packet acquisition section 1322. In the case where it is determined by the electric power-supply determination section 135 that the electric power-resupply request information is added to the command packet, the electric power-supply packet generation section 134 re-generates the electric power-supply packet. The transmission section 160 retransmits the electric power-supply packet generated by the electric power-supply packet generation section 134 to the operation terminal 200 via a wireless signal.

There can be considered a case where it is difficult for the operation terminal 200 to transmit a command to the information processing apparatus 100 in a manner that the command is included in one packet. In that case, it is necessary that the operation terminal 200 divide the command into a plurality of pieces and transmit each of the obtained plurality of pieces of command to the information processing apparatus 100, each of the obtained plurality of pieces of command being included in a separate packet. Accordingly, in that case, the information processing apparatus 100 may further include a storage section 140 and an electric power-supply determination section 135.

In the case where the information processing apparatus 100 further includes the storage section 140 and the electric power-supply determination section 135, and when it is determined by the electric power-supply determination section 135 that the electric power-resupply request information is added to the command packet, the electric power-supply packet generation section 134 re-generates the electric power-supply packet. The transmission section 160 retransmits the electric power-supply packet generated by the electric power-supply packet generation section 134 to the operation terminal 200 via a wireless signal. When receiving the electric power-supply packet, the operation terminal 200 can acquire electric power for transmitting a command packet from the received electric power-supply packet. Further, in the case where it is determined by the electric power-supply determination section 135 that the electric power-resupply request information is added to the command packet, the processing execution section 136 causes the command included in the command packet acquired by the command packet acquisition section 1322 to be stored into the storage section 140. In this manner, it is assumed that a first command to an N−1th command (N represents an integer of 2 or more) are stored in the storage section 140. In the case where it is determined by the electric power-supply determination section 135 that the electric power-resupply request information is not added to the command packet, the processing execution section 136 combines an Nth command included in the command packet acquired by the command packet acquisition section 1322 with the first command to the N−1th command stored in the storage section 140, and executes processing designated by the obtained command.

The processing execution section 136 may determine whether command division transmission information for indicating that the command is to be transmitted by being divided into a plurality of pieces is added to the command packet acquired by the command packet acquisition section 1322. In this case, for example, in the case where the processing execution section 136 determines that the command division transmission information is added to the command packet, the processing execution section 136 may determine that the command included in the command packet acquired by the command packet acquisition section 1322 is a command divided by the operation terminal 200. Further, for example, in the case where the processing execution section 136 determines that the command division transmission information is not added to the command packet, the processing execution section 136 may determine that the command included in the command packet acquired by the command packet acquisition section 1322 is not a command divided by the operation terminal 200.

In the case where the information processing apparatus 100 includes a display section 170, the control section 130 includes a display control section 137, and in the case where the information processing apparatus 100 includes an audio output section 180, the control section 130 includes an audio output control section 139. In the case where the information processing apparatus 100 is used as a TV set, the processing execution section 136 outputs video data to the display control section 137 and also outputs audio data to the audio output control section 139. The display control section 137 causes the display section 170 to display video based on the video data, and the audio output control section 139 causes the audio output section 180 to output audio based on the audio data.

[1-4. Functional Configuration of Operation Terminal]

Figure 4:
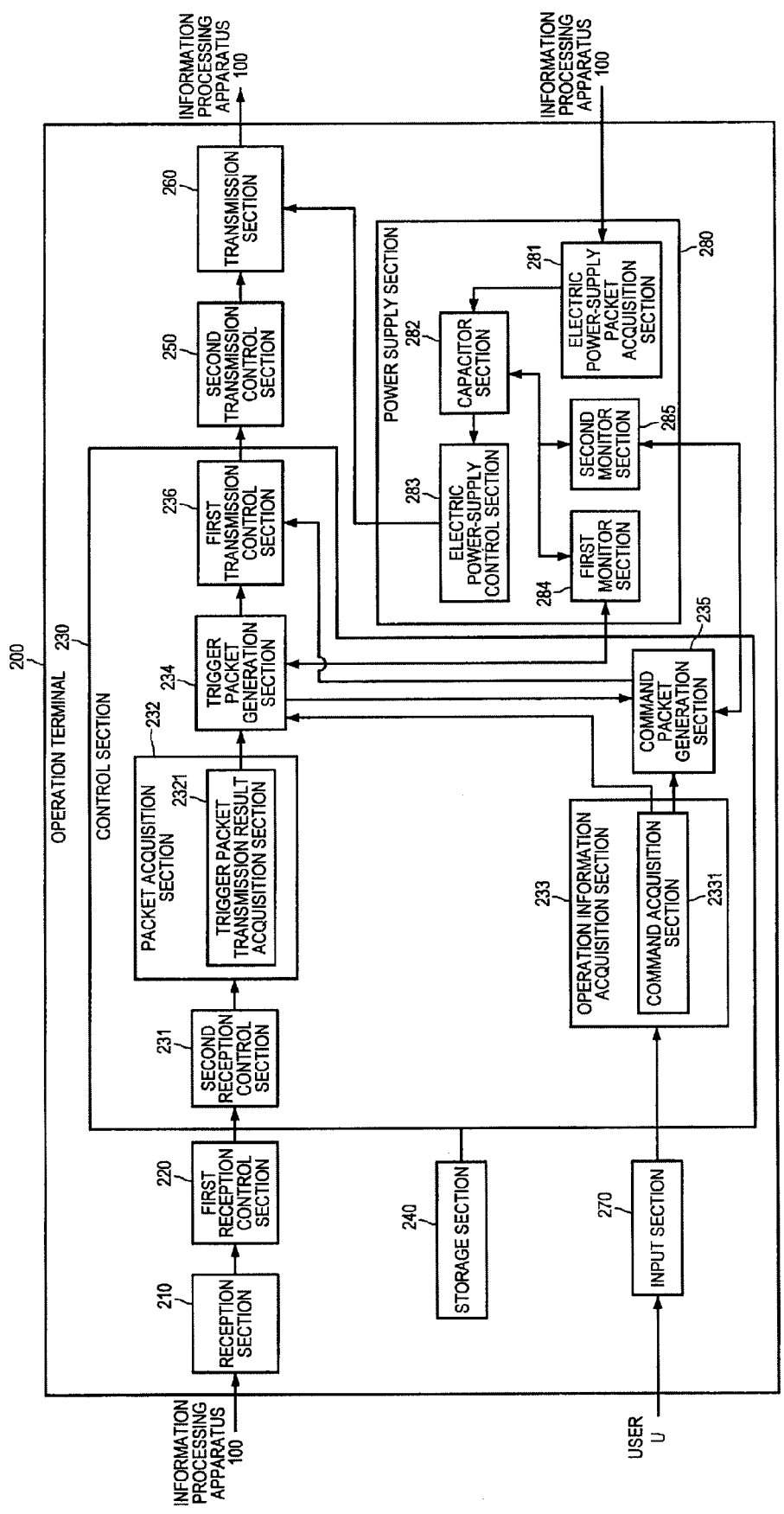
FIG. 4 is a diagram showing a functional configuration of an operation terminal according to the present embodiment.

FIG. 4 is a diagram showing a functional configuration of an operation terminal according to the present embodiment. With reference to FIG. 4 (refer to other figures as appropriate), the functional configuration of the operation terminal according to the present embodiment will be described.

As shown in FIG. 4, the operation terminal 200 includes at least an input section 270, a control section 230, and a transmission section 260.

Further, the control section 230 includes at least an operation information acquisition section 233 and a trigger packet generation section 234. The operation information acquisition section 233 includes at least a command acquisition section 2331.

The input section 270 is, for example, capable of accepting input of operation information from a user U through a button operation or the like, and has a function of accepting operation information including a command for designating processing that the information processing apparatus 100 is caused to execute.

The command acquisition section 2331 has a function of acquiring the command from the operation information the input of which is accepted by the input section 270.

When the command is acquired by the command acquisition section 2331, the trigger packet generation section 234 generates a trigger packet which is a packet smaller than the command packet including the command. As described above, the trigger packet may be any as long as it is an extremely small packet, and may include only a preamble, for example.

The transmission section 260 includes an antenna and the like, and has a function of transmitting the trigger packet generated by the trigger packet generation section 234 to the information processing apparatus 100 via a wireless signal. The transmission section 260 may have a configuration in which the same antenna is shared with a reception section 210 or may have a configuration which has different antenna from that included in the reception section 210.

The control section 230 includes a first transmission control section 236 as necessary. The first transmission control section 236 has a function of performing modulation processing, encoding processing, and the like with respect to the baseband signal. The modulation processing and the encoding processing are not particularly limited.

The operation terminal 200 includes a second transmission control section 250 as necessary. In the case where the control section 230 performs processing using a digital signal, the second transmission control section 250 converts the digital signal to be transmitted into an analog signal. Further, the second transmission control section 250 performs frequency conversion in a manner that the baseband signal is converted into a high-frequency signal by upconversion and outputs the signal to the transmission section 260.

The operation terminal 200 may further include the reception section 210 and a trigger packet transmission result acquisition section 2321. The reception section 210 receives a trigger packet reception-notification packet for indicating that the trigger packet is received via a wireless signal, from the information processing apparatus 100 which received the trigger packet via a wireless signal. The trigger packet transmission result acquisition section 2321 acquires the trigger packet reception-notification packet from the wireless signal received by the reception section 210. Further, the trigger packet generation section 234 sequentially generates a plurality of the trigger packets until the trigger packet reception-notification packet is acquired by the trigger packet transmission result acquisition section 2321, and the transmission section 260 sequentially transmits the trigger packets generated by the trigger packet generation section 234 to the information processing apparatus 100 via a wireless signal. For example, in the case where packet identification information for identifying a trigger packet transmission result is imparted to a packet acquired from the wireless signal received by the reception section 210, a packet acquisition section 232 regards the packet as the trigger packet transmission result and outputs the packet to the trigger packet transmission result acquisition section 2321.

The operation terminal 200 includes a first reception control section 220 as necessary. The first reception control section 220 performs, with respect to the wireless signal received by the reception section 210, analog processing such as amplification, filtering, and downconversion as necessary, to thereby perform frequency conversion in a manner that a high-frequency signal is converted into a baseband signal. Further, in the case where the control section 230 performs processing using a digital signal, the first reception control section 220 converts an analog-type baseband signal into a digital-type baseband signal.

The control section 230 includes a second reception control section 231 as necessary. The second reception control section 231 has a function of performing demodulation processing, decoding processing, and the like with respect to the baseband signal. The demodulation processing and the decoding processing are not particularly limited.

The operation terminal 200 includes a power supply section 280 as necessary. The power supply section 280 may include an electric power-supply packet acquisition section 281, a capacitor section 282, and an electric power-supply control section 283, and the control section 230 may include a command packet generation section 235. In that case, the electric power-supply packet acquisition section 281 acquires an electric power-supply packet for supplying electric power from the information processing apparatus 100 which received the trigger packet via a wireless signal. The capacitor section 282 acquires electric power from the electric power-supply packet acquired by the electric power-supply packet acquisition section 281 and accumulates the electric power. The electric power-supply control section 283 supplies the electric power accumulated by the capacitor section 282 to the transmission section 260. The command packet generation section 235 generates a command packet. The transmission section 260 further transmits the command packet generated by the command packet generation section 235 by using the electric power supplied from the electric power-supply control section 283.

The operation terminal 200 may further include a second monitor section 285 and an electric power-supply stop request packet-generation section. The second monitor section 285 monitors the electric power accumulated in the capacitor section 282. The electric power-supply stop request packet-generation section generates, in the case where it is determined by the second monitor section 285 that the electric power exceeds a predetermined value, an electric power-supply stop request packet for indicating that the transmission of the electric power-supply packet is to be stopped. The transmission section 260 further transmits the electric power-supply stop request packet generated by the electric power-supply stop request packet-generation section to the information processing apparatus 100. Further, the command packet generation section 235 may output the generated command packet in the case where it is determined by the second monitor section 285 that the electric power exceeds a predetermined value.

The power supply section 280 may further include a first monitor section 284. The first monitor section 284 monitors the electric power accumulated in the capacitor section 282. The trigger packet generation section 234 may further output the generated trigger packet in the case where it is determined by the first monitor section 284 that the electric power exceeds a predetermined value.

There can be considered a case where a plurality of the commands are acquired by the command acquisition section 2331. In this case, the command packet generation section 235 refers to the commands acquired by the command acquisition section 2331 as a first command to an Nth command (N represents an integer of 2 or more) sequentially from the beginning. The command packet generation section 235 adds electric power-resupply request information for indicating retransmission of the electric power-supply packet to the first command to the N−1th command and refers to the first command to the N−1th command added with the electric power-resupply request information as a first command packet to an N−1th command packet, and the command packet generation section 235 does not add the electric power-resupply request information to the Nth command and refers to the Nth command not added with the electric power-resupply request information as an Nth command packet. The transmission section 260 sequentially transmits the first command packet to the Nth command packet which are generated by the command packet generation section 235 to the information processing apparatus 100.

There is a case where it is difficult for the operation terminal 200 to transmit a command in a manner that the command is included in one packet. In that case, the command packet generation section 235 divides the command into a plurality of pieces and refers to the plurality of commands acquired by the division as a first command to an Nth command (N represents an integer of 2 or more) sequentially from the beginning. The command packet generation section 235 adds electric power-resupply request information for indicating retransmission of the electric power-supply packet to the first command to the N−1th command and refers to the first command to the N−1th command added with the electric power-resupply request information as a first command packet to an N−1th command packet, and the command packet generation section 235 does not add the electric power-resupply request information to the Nth command and refers to the Nth command not added with the electric power-resupply request information as an Nth command packet. The transmission section 260 sequentially transmits the first command packet to the Nth command packet which are generated by the command packet generation section 235 to the information processing apparatus 100.

In the case where a command is to be divided into a plurality of pieces, the command packet generation section 235 may add, to the command, command division transmission information for indicating that the command is to be transmitted by being divided into a plurality of pieces.

Further, it is necessary that the operation terminal 200 acquire electric power to transmit a trigger packet, and there are various acquisition methods. The transmission section 260 can transmit the trigger packet to the information processing apparatus 100 via a wireless signal by using, for example, at least one of the following, electric power acquired from an electric power-supply packet which is transmitted from the information processing apparatus 100 at every predetermined time period, electric power acquired from a piezoelectric element generated by holding down a button provided to the operation terminal 200, electric power acquired by electromagnetic induction, and electric power acquired from a solar battery.

In the case where the information processing apparatus 100 includes a display section 170, the control section 130 includes a display control section 137, and in the case where the information processing apparatus 100 includes an audio output section 180, the control section 130 includes an audio output control section 139. In the case where the information processing apparatus 100 is used as a TV set, the processing execution section 136 outputs video data to the display control section 137 and also outputs audio data to the audio output control section 139. The display control section 137 causes the display section 170 to display video based on the video data, and the audio output control section 139 causes the audio output section 180 to output audio based on the audio data.

The operation terminal 200 may include a storage section 240. The storage section 240 is capable of being used for storing a program and data, for example.

[1-5. Hardware Configuration of Information Processing Apparatus]

Figure 5:
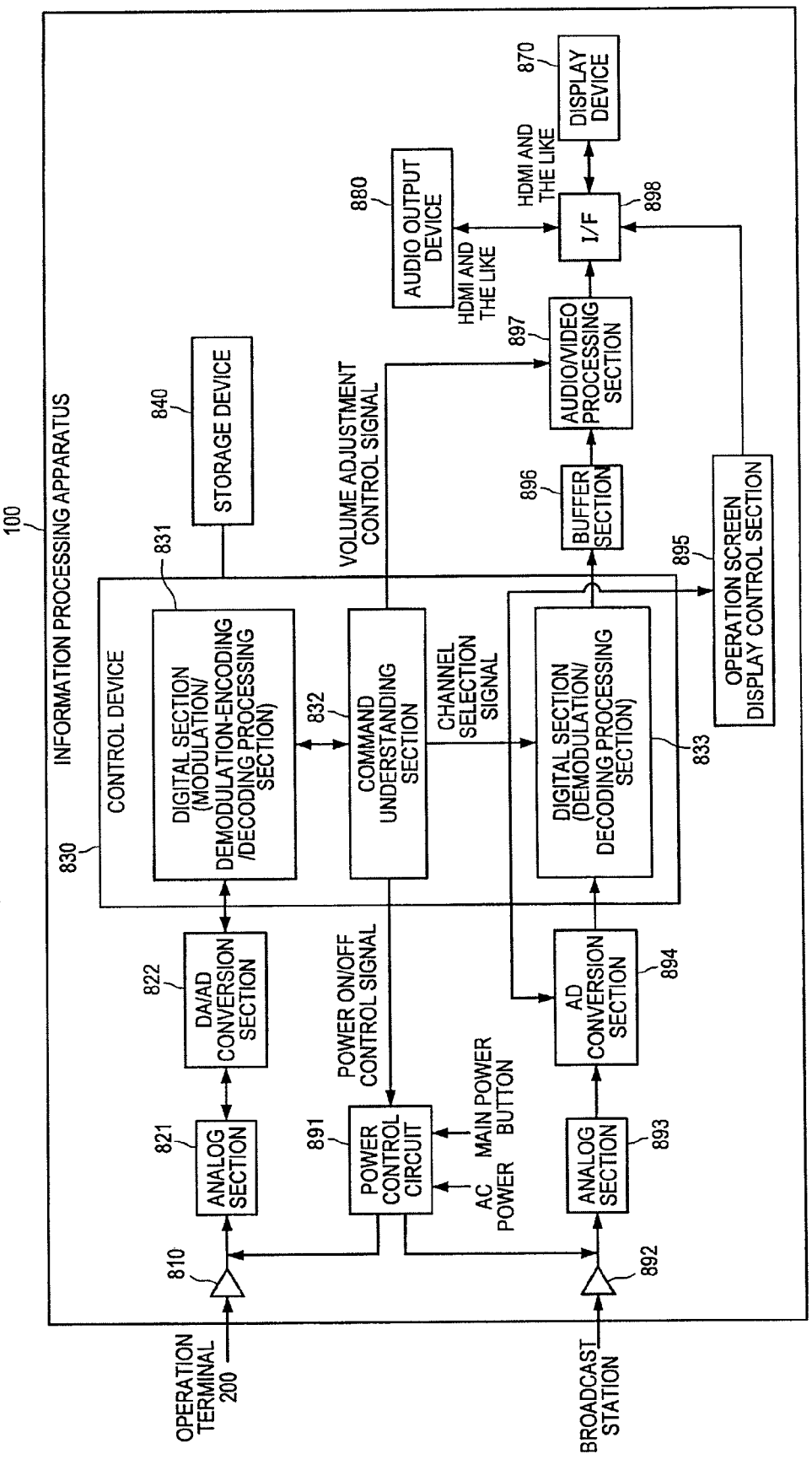
FIG. 5 is a diagram showing a hardware configuration of the information processing apparatus according to the present embodiment.

FIG. 5 is a diagram showing a hardware configuration of the information processing apparatus according to the present embodiment. With reference to FIG. 5 (refer to other figures as appropriate), the hardware configuration of the information processing apparatus according to the present embodiment will be described. Note that FIG. 5 shows a hardware configuration example in the case where the information processing apparatus 100 is applied to the TV set. Therefore, in the case where the information processing apparatus 100 is applied to a device other than the TV set, it is possible for the device to be provided with a necessary configuration which is selected appropriately from the hardware configuration shown in FIG. 5.

As shown in FIG. 5, the information processing apparatus 100 includes an antenna 810, an analog section 821, a DA/AD conversion section 822, a control device 830, a storage device 840, a power control circuit 891, an antenna 892, an analog section 893, an AD conversion section 894, a buffer section 896, an audio/video processing section 897, an I/F (Inter-Face) 898, an audio output device 880, a display device 870, an operation screen display control section 895, and the like.

The antenna 810 functions as, for example, an example of the reception section 110, and has a function of receiving a wireless signal using a radio wave transmitted from the operation terminal 200 and outputting the wireless signal to the analog section 821. Further, the antenna 810 functions as an example of the transmission section 160, and has a function of transmitting a high-frequency signal output from the analog section 821 as a wireless signal using a radio wave.

The analog section 821 functions, for example, as an example of the first reception control section 120, and performs frequency conversion in a manner that the high-frequency signal output from the antenna 810 is converted into a baseband signal and outputs the baseband signal to the DA/AD conversion section 822. Further, the analog section 821 functions as an example of the second transmission control section 150, and performs frequency conversion in a manner that the baseband signal output from the DA/AD conversion section 822 is converted into a high-frequency signal and outputs the high-frequency signal to the antenna 810.

The DA/AD conversion section 822 functions as an example of the first reception control section 120, and converts the analog-type baseband signal output from the analog section 821 into a digital-type baseband signal and outputs the digital-type baseband signal to a digital section 831. Further, the DA/AD conversion section 822 functions as an example of the second transmission control section 150, and converts the digital-type baseband signal output from the digital section 831 into an analog-type baseband signal and outputs the analog-type baseband signal to an analog section 821.

The control device 830 functions as an example of the control section 130. The control device 830 includes, for example, a CPU (Central Processing Unit) and an RAM (Random Access Memory), and the function thereof is realized by reading a program stored in the storage device 840, developing the program in the RAM, and executing the program developed in the RAM. Further, the control device 830 may include a dedicated circuit. The control device 830 includes a digital section (modulation/demodulation-encoding/decoding processing section) 831, a command understanding section 832, and a digital section (demodulation/decoding processing section) 833.

The digital section 831 functions, for example, as an example of the second reception control section 131. The digital section 831 performs demodulation processing, decoding processing, and the like with respect to the digital-type baseband signal output from the DA/AD conversion section 822, and outputs the processed digital-type baseband signal to the command understanding section 832. Further, the digital section 831 functions as an example of the first transmission control section 138. The digital section 831 performs modulation processing, encoding processing, and the like with respect to the digital-type baseband signal output from the command understanding section 832, and outputs the processed digital-type baseband signal to the DA/AD conversion section 822.

The storage device 840 functions as an example of the storage section 140, and includes, for example, a non-volatile memory such as an HDD (Hard Disk Drive). In the case where the control section 130 includes a CPU, an RAM, and the like, the storage device 840 has a function of storing a program to be executed by the control section 130 and various kinds of data used when the control section 130 executes the program.

The command understanding section 832 functions as an example of the packet acquisition section 132. The command understanding section 832 extracts a command from the signal output from the digital section 831, understands the extracted command, and outputs a signal to each block based on the understood command. For example, when the understood command indicates switching the power between ON and OFF, the command understanding section 832 outputs a power ON/OFF control signal to the power control circuit 891. Further, for example, when the understood command indicates channel selection, the command understanding section 832 outputs a channel selection signal to the AD conversion section 894, the digital section 833, the operation screen display control section 895, and the like. Still further, for example, when the understood command indicates volume adjustment, the command understanding section 832 outputs a volume adjustment control signal to the audio/video processing section 897.

The power control circuit 891 includes a main power button, and when the main power button is held down by the user U and the like, the power control circuit 891 acquires electric power from AC (Alternating Current) power source, and supplies the acquired electric power to the antenna 810, the antenna 892, and the like.

The antenna 892 receives a program data signal as an example of the data processed in the information processing apparatus 100 from a broadcast station and the like, and outputs the program data signal to the analog section 893.

The analog section 893 performs frequency conversion in a manner that the high-frequency signal output from the antenna 892 is converted into a baseband signal and outputs the baseband signal to the AD conversion section 894.

The AD conversion section 894 extracts, based on the channel selection signal output from the command understanding section 832, a signal having a frequency designated by the channel which is indicated by the channel selection signal, from the analog-type baseband signal output from the analog section 893, and then converts the extracted signal into a digital-type baseband signal and outputs the digital-type baseband signal to the digital section 833.

The digital section 833 performs, based on the channel selection signal output from the command understanding section 832, demodulation processing, decoding processing, and the like with respect to the digital-type baseband signal output from the AD conversion section 894, and outputs the processed digital-type baseband signal to the buffer section 896 as an audio/video signal.

The buffer section 896 has a function of temporality accumulating the audio/video signal output from the digital section 833. The audio/video signal temporarily accumulated in the buffer section 896 is appropriately extracted by the audio/video processing section 897.

The audio/video processing section 897 extracts the audio/video signal from the buffer section 896, and separates an audio signal and a video signal from the extracted audio/video signal. The audio/video processing section 897 performs, with respect to the audio signal obtained by the separation, processing to adjust the volume based on the volume adjustment control signal output from the command understanding section 832, and outputs the video signal and the audio signal in which the volume has been adjusted to the I/F 898.

The operation screen display control section 895 specifies, based on the channel selection signal output from the command understanding section 832, information such as a channel number to be displayed and a display position of the channel number, and outputs the information such as the specified channel number and display position of the channel number to the I/F 898.

The I/F 898 outputs the audio signal output from the audio/video processing section 897 to the audio output device 880 through an HDMI (High Definition Multimedia Interface) and the like. Further, the I/F 898 outputs the video signal output from the audio/video processing section 897 to the display device 870 through the HDMI and the like. The I/F 898 superimposes, on the video signal, the channel number or the like created from the operation screen display control section 895 based on the information such as the channel number and the display position of the channel number.

The display device 870 functions as an example of the display section 170, and has a function of outputting video based on the video signal output from the I/F 898.

The audio output device 880 functions as an example of the audio output section 180, and has a function of outputting audio based on the audio signal output from the I/F 898.

[1-6. Hardware Configuration of Operation Terminal]

Figure 6:
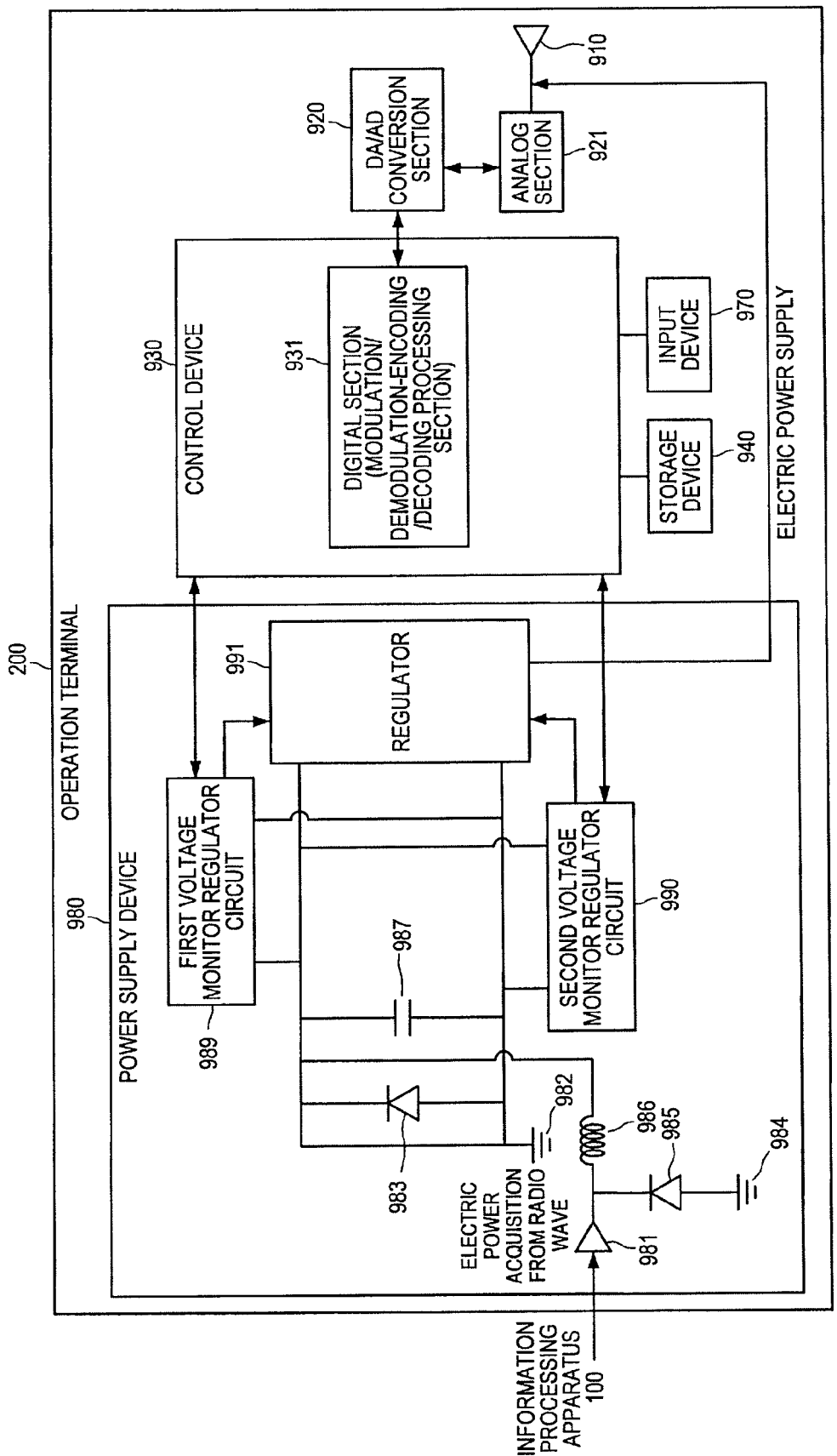
FIG. 6 is a diagram showing a hardware configuration of the operation terminal according to the present embodiment.

FIG. 6 is a diagram showing a hardware configuration of the operation terminal according to the present embodiment. With reference to FIG. 6 (refer to other figures as appropriate), the hardware configuration of the operation terminal according to the present embodiment will be described. Note that FIG. 6 shows an example of the hardware configuration of the operation terminal 200. Therefore, it is possible for the operation terminal to be provided with a necessary configuration which is selected appropriately from the hardware configuration shown in FIG. 6.

As shown in FIG. 6, the operation terminal 200 includes a power supply device 980, a control device 930, a storage device 940, an input device 970, a DA/AD conversion section 920, an analog section 921, an antenna 910, and the like. The power supply device 980 includes an antenna 981, a ground point 982, a commutator 983, a ground point 984, a commutator 985, a coil 986, a capacitor 987, a first voltage monitor regulator circuit 989, a second voltage monitor regulator circuit 990, a regulator 991, and the like.

The antenna 981 functions as an example of the electric power-supply packet acquisition section 281, and receives a wireless signal using a radio wave transmitted from the information processing apparatus 100. The wireless signal using a radio wave received by the antenna 981 is converted into a half-wave rectified wave by the commutator 983 and the converted half-wave rectified wave flows into the capacitor 987, and hence, electric power is accumulated in the capacitor 987. The volume of the capacitor 987 may be any as long as it is large enough for accumulating the electric power for transmitting a packet. As the capacitor 987, there can be used a chip capacitor or the like.

The electric power accumulated in the capacitor 987 is monitored by the voltage monitor performed by the first voltage monitor regulator circuit 989 and the second voltage monitor regulator circuit 990. The first voltage monitor regulator circuit 989 functions as an example of the first monitor section 284, and the second voltage monitor regulator circuit 990 functions as an example of the second monitor section 285. In the case where it is determined by the first voltage monitor regulator circuit 989 that the electric power accumulated in the capacitor 987 exceeds a predetermined value, the regulator 991 supplies the electric power to the antenna 910. Further, in the case where it is determined by the second voltage monitor regulator circuit 990 that the electric power accumulated in the capacitor 987 exceeds the predetermined value, the regulator 991 supplies the electric power to the antenna 910.

The control device 930 functions as an example of the control section 230. The control device 930 includes, for example, a CPU and an RAM, and the function thereof is realized by reading a program stored in the storage device 940, developing the program in the RAM, and executing the program developed in the RAM. Further, the control device 930 may include a dedicated circuit. The control device 930 includes a digital section (modulation/demodulation-encoding/decoding processing section) 931.

The digital section 931 functions, for example, as an example of the first transmission control section 236. The digital section 931 performs demodulation processing, decoding processing, and the like with respect to a digital-type baseband signal such as various kinds of packet generated in the control device 930, and outputs the processed digital-type baseband signal to the DA/AD conversion section 920.

The DA/AD conversion section 920 functions as an example of the second transmission control section 250. The DA/AD conversion section 920 converts the digital-type baseband signal output from the digital section 831 into an analog-type baseband signal and outputs the analog-type baseband signal to the analog section 921.

The analog section 921 functions, for example, as an example of the second transmission control section 250. The analog section 921 converts the baseband signal output from the DA/AD conversion section 920 into a high-frequency signal and output the high-frequency signal to the antenna 910.

The antenna 910 functions, for example, as an example of the transmission section 260, and has a function of transmitting the high-frequency signal output from the analog section 921 as a wireless signal using a radio wave.

The storage device 940 functions as an example of the storage section 240, and includes, for example, a non-volatile memory. In the case where the control section 230 includes a CPU, an RAM, and the like, the storage device 940 has a function of storing a program to be executed by the control section 230 and various kinds of data used when the control section 230 executes the program.

The input device 970 functions as an example of the input section 270, and is, for example, capable of accepting input of information from a user U through a button operation.

[1-7. Flow of Processing Executed by Information Processing System]

Figure 7:
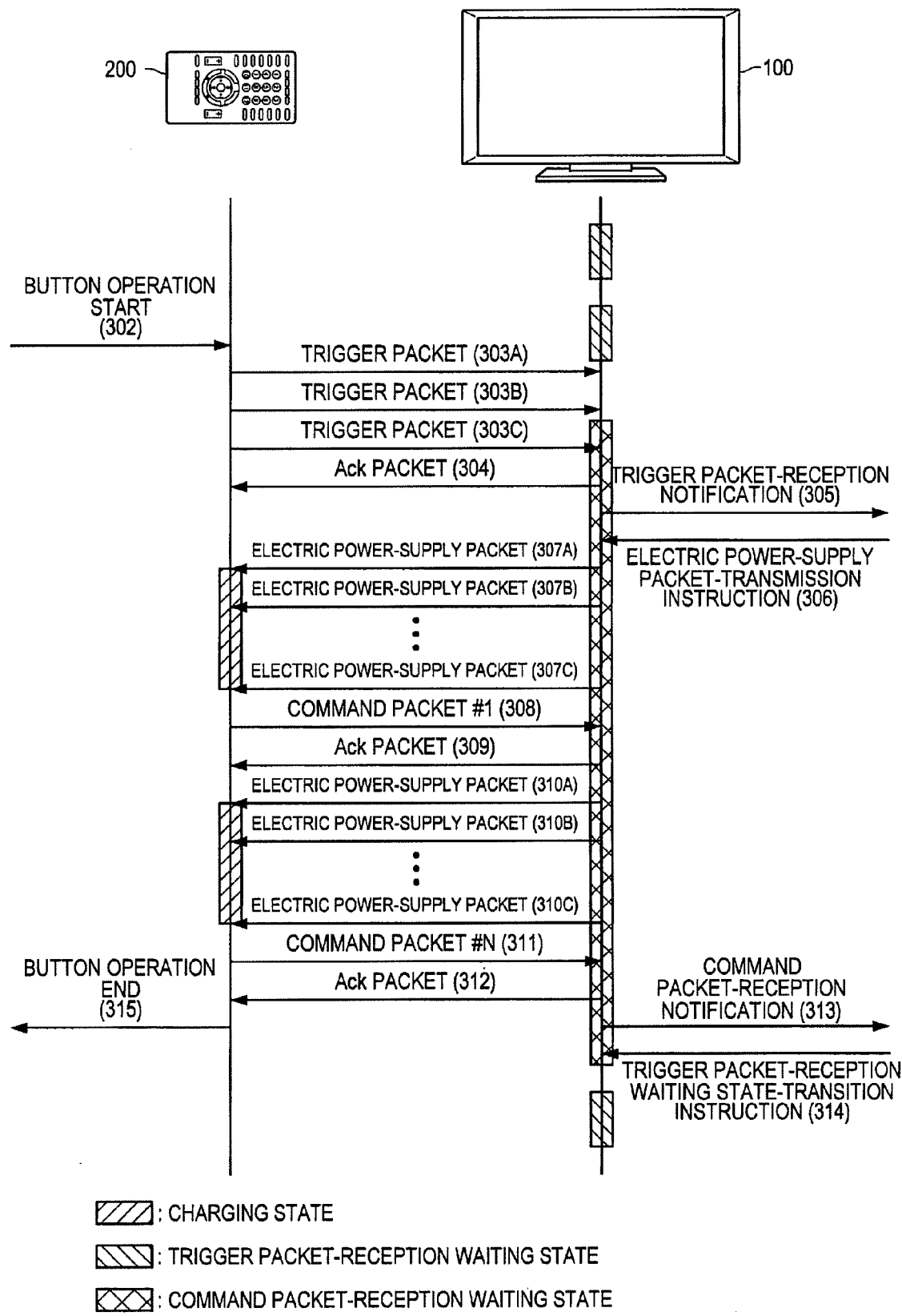
FIG. 7 is a sequence diagram showing a flow of processing executed by an information processing system.

FIG. 7 is a sequence diagram showing a flow of processing executed by an information processing system. With reference to FIG. 7 (refer to other figures as appropriate), the flow of processing executed by the information processing system will be described. In FIG. 7, there is shown the flow of processing executed in the case where the operation terminal 200 already has electric power to transmit a trigger packet. The details of an example of the operation terminal 200 acquiring the electric power to transmit a trigger packet will be described later with reference to FIG. 8.

In FIG. 7, the line extending downwards from the information processing apparatus 100 and the line extending downwards from the operation terminal 200 (hereinafter, each may be referred to as "time line") each represent elapsed time, and the arrows connecting between the time lines each represent a packet which comes and goes between the information processing apparatus 100 and the operation terminal 200 via a wireless signal. Further, the arrows at outside the time lines each represent an exchange of information between respective devices.

As shown in FIG. 7, the user U starts button operation on the operation terminal 200, and the operation terminal 200 accepts operation information from the user U by accepting a button operation start 302 from the user U. When accepting the button operation start 302, the operation terminal 200 transmits a trigger packet 303A to the information processing apparatus 100. As shown in FIG. 7, in the case where the information processing apparatus 100 intermittently transits to a trigger packet-reception waiting state (Receive Window), the information processing apparatus 100 is caused to send back an Ack packet (Acknowledgement Packet) 304 to the operation terminal 200 after receiving the trigger packet.

In FIG. 7, there is shown an example in which the information processing apparatus 100 is not able to receive the trigger packet 303A and a trigger packet 303B, but is able to receive a trigger packet 303C, and after having received the trigger packet 303C, the information processing apparatus 100 sends back the Ack packet 304 to the operation terminal 200. For example, the operation terminal 200 transmits trigger packets (e.g., trigger packets 303A, 303B, and 303C) to the information processing apparatus 100 until receiving the Ack packet 304 from the information processing apparatus 100. The operation terminal 200 can stop the transmission of the trigger packet when receiving the Ack packet 304 from the information processing apparatus 100. In the case where the information processing apparatus 100 intermittently transits to the trigger packet-reception waiting state, there may occur a case where it is necessary for the operation terminal 200 to continue the transmission of trigger packets during the time period from when the trigger packet-reception waiting state of the information processing apparatus 100 is released to when the state of the information processing apparatus 100 transits to the trigger packet-reception waiting state again.

In the information processing apparatus 100, when the trigger packet 303C is received by the reception section 110, a trigger packet-reception notification 305 is output to the control section 130, and then an electric power-supply packet-transmission instruction 306 is output from the control section 130. The trigger packet-reception notification 305 may be, for example, the trigger packet 303C itself received by the reception section 110, or a notification for indicating that the trigger packet is received. When the electric power-supply packet-transmission instruction 306 is output by the control section 130, the information processing apparatus 100 transmits electric power-supply packets 307A, 307B, and 307C to the operation terminal 200 by the transmission section 160. Here, the information processing apparatus 100 transmits a predetermined number of electric power-supply packets to the operation terminal 200, and the timing at which the information processing apparatus 100 stops the transmission of the electric power-supply packet to the operation terminal 200, however, is not particularly limited as described above.

The operation terminal 200 acquires electric power from the electric power-supply packet and saves the electric power, and when receiving the electric power-supply packet a predetermined number of times, the operation terminal 200 performs transmission of a command packet. In the case where it is difficult for the operation terminal 200 to cause all necessary information to be included in one command packet, the operation terminal 200 divides a command packet into a plurality of command packets (e.g., a command packet #1 (308) to a command packet #N (311)), and sequentially transmits each of the plurality of command packets acquired by the division to the information processing apparatus 100.

As described above, there may be added to each command packet, for example, the electric power-resupply request information for indicating retransmission of the electric power-supply packet. In the case where the electric power-resupply request information is added to the command packet, the information processing apparatus 100 further transmits a predetermined number of electric power-supply packets to the operation terminal 200. Also in this case, the timing at which the information processing apparatus 100 stops the transmission of the electric power-supply packet to the operation terminal 200 is not particularly limited. In FIG. 7, there is shown an example in which, after having received the command packet #1 (308), the information processing apparatus 100 sends back an Ack packet 309 to the operation terminal 200, also determines that the electric power-resupply request information is added to the command packet #1 (308), and sends back electric power-supply packets 310A, 310B, and 310C to the operation terminal 200. Further, in the example, there is shown that after having received a command packet #N (311), the information processing apparatus 100 sends back an Ack packet 312 to the operation terminal 200, also determines that the electric power-resupply request information is not added to the command packet #N (311), and does not send back an electric power-supply packet to the operation terminal 200.

In the information processing apparatus 100, when the reception section 110 receives the command packet #N (311) to which the electric power-resupply request information is not added, the control section 130 issues a command packet-reception notification 313 indicating completion of command packet reception. When the command packet-reception notification 313 is issued, the control section 130 combines command packets from the command packet #1 (308) to the command packet #N (311), and executes processing designated by the obtained command. The control section 130 outputs a trigger packet-reception waiting state-transition instruction 314 to the reception section 110.

When the operation terminal 200 receives the Ack packet 312 from the information processing apparatus 100, the operation terminal 200 performs a button operation end 315 in the operation terminal 200.

Note that FIG. 7 shows the flow of processing executed by the information processing system 10 in the case where it is difficult for the operation terminal 200 to cause all necessary information to be included in one command packet. Accordingly, in the example shown in FIG. 7, the plurality of commands acquired by the operation terminal 200 dividing a command are each included in a packet and then are transmitted, however, each command included in each of the plurality of command packets may be a complete command in itself. In this case, each time the reception section 110 receives each of the packets from the command packet #1 (308) to the command packet #N (311), the control section 130 may issue the command packet-reception notification 313 indicating completion of command packet reception. In the case where the command packet-reception notification 313 is issued, the control section 130 may execute processing in accordance with the command included in each packet received by the reception section 110. The control section 130 may, for example, after having executed the processing in accordance with each command included in the command packets #1 (308) to #N−1, output the electric power-supply packet-transmission instruction 306, and then the control section 130 may, for example, after having executed the processing in accordance with the command included in the command packet #N (311), output the trigger packet-reception waiting state-transition instruction 314 to the reception section 110.

[1-8. Flow of Processing for Acquiring Electric Power for Transmitting Trigger Packet]

Figure 8:
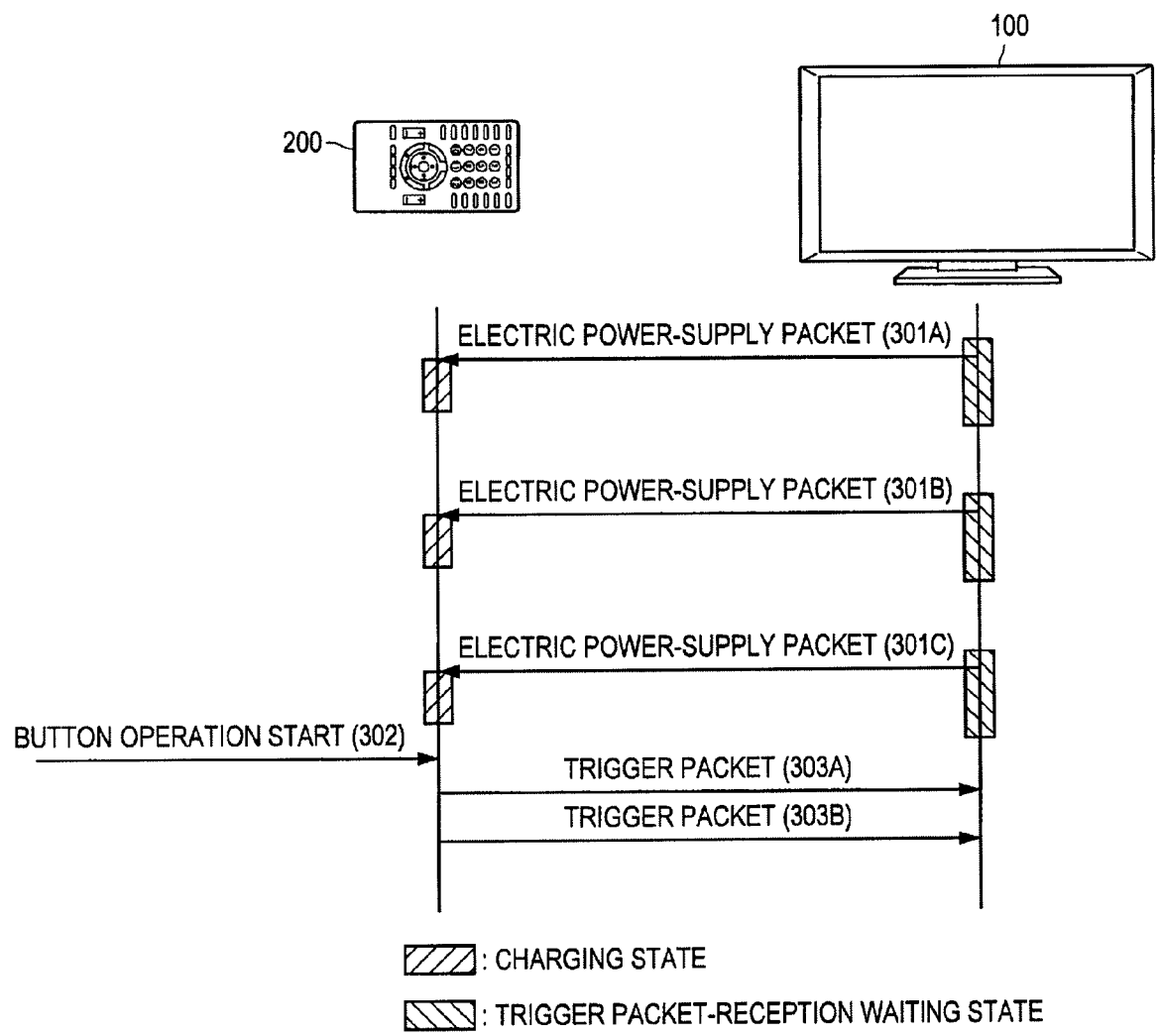
FIG. 8 is a sequence diagram showing an example of a flow of processing in which an operation terminal acquires electric power for transmitting a trigger packet.

FIG. 8 is a sequence diagram showing an example of a flow of processing in which an operation terminal acquires electric power for transmitting a trigger packet. With reference to FIG. 8 (refer to other figures as appropriate), the example of the flow of processing in which the operation terminal acquires electric power for transmitting a trigger packet will be described.

When the information processing system 10 executes the flow of processing shown in FIG. 7, there occurs a case where it is necessary for the operation terminal 200 to save the electric power to transmit a trigger packet to the information processing apparatus 100. The trigger packet itself is only used for starting the supply of electric power, and hence may be formed of a packet smaller than an electric power-supply packet and may be an extremely small packet. For example, the trigger packet may include only a preamble. As described above, particularly in the case where the information processing apparatus 100 intermittently transits to a trigger packet-reception waiting state, it becomes necessary for the operation terminal 200 to transmit a trigger packet a plurality of times, and hence it is necessary that the operation terminal 200 save the electric power to transmit the trigger packet.

For such occasion, there can be used a technique involving periodically transmitting the electric power-supply packet from the information processing apparatus 100. That is, as shown in FIG. 8, in the case where the information processing apparatus 100 intermittently transits to the trigger packet-reception waiting state, the periodic transmissions of electric power-supply packets 301A, 301B, and 301C from the information processing apparatus 100 to the operation terminal 200 are synchronized with the periodic trigger packet-reception waiting states.

As a technique for saving the electric power to be used for the operation terminal 200 to transmit the trigger packet, there is given, in addition to the above, a technique involving utilizing a piezoelectric element generated by a physical operation of holding down a button or the like. Further, there may be used a technique of using electromagnetic induction used in a contactless IC card which is typified by Felica (registered trademark), a technique of using a solar battery, and the like. Still further, it is possible to save the electric power for transmitting the trigger packet by using two or more of those techniques in combination.

2. Modified Example

It should be understood by those skilled in the art that various modifications, combinations, sub-combinations and alterations may occur depending on design requirements and other factors insofar as they are within the scope of the appended claims or the equivalents thereof.

3. Summary

According to the first embodiment, when the operation terminal 200 performs communication by using electric power which the information processing apparatus 100 has, it is possible to enhance the utilization efficiency of the electric power. Further, even when the operation terminal 200 has a configuration in which electric power such as a battery is absent, it becomes possible that the user U can semi-permanently use the operation terminal 200.

The present application contains subject matter related to that disclosed in Japanese Priority Patent Application JP 2009-179365 filed in the Japan Patent Office on Jul. 31, 2009, the entire content of which is hereby incorporated by reference.

What is claimed is:
1. An information processing apparatus comprising:
a reception section to receive a trigger packet, which is a packet smaller than a command packet including a command for designating processing to be executed by the information processing apparatus, from an operation terminal via a wireless signal;
a trigger packet acquisition section to acquire the trigger packet from the wireless signal received by the reception section;

an electric power-supply packet generation section to generate an electric power-supply packet for supplying electric power, when the trigger packet is acquired by the trigger packet acquisition section; and a transmission section to transmit the electric power-supply packet generated by the electric power-supply packet generation section to the operation terminal via a wireless signal.

2. The information processing apparatus according to claim 1, further comprising:

a trigger packet reception-notification section to generate a trigger packet reception-notification packet for indicating that the trigger packet is received, when the trigger packet is acquired by the trigger packet acquisition section, wherein the transmission section further transmits the trigger packet reception-notification packet generated by the trigger packet reception-notification section to the operation terminal via a wireless signal.

3. The information processing apparatus according to claim 1, wherein the electric power-supply packet generation section sequentially generates a predetermined number of the electric power-supply packets, and wherein the transmission section sequentially transmits the predetermined number of the electric power-supply packets generated by the electric power-supply packet generation section to the operation terminal via a wireless signal.

4. The information processing apparatus according to claim 1, further comprising:

an electric power-supply stop request packet-acquisition section, wherein the reception section further receives an electric power-supply stop request packet for indicating that the transmission of the electric power-supply packet is to be stopped from the operation terminal via a wireless signal, wherein the electric power-supply stop request packet-acquisition section acquires the electric power-supply stop request packet from the wireless signal received by the reception section, wherein the electric power-supply packet generation section sequentially generates a plurality of the electric power-supply packets until the electric power-supply stop request packet is acquired by the electric power-supply stop request packet-acquisition section, and wherein the transmission section sequentially transmits the plurality of the electric power-supply packets generated by the electric power-supply packet generation section to the operation terminal via a wireless signal.

5. The information processing apparatus according to claim 1, further comprising:

a command packet acquisition section, wherein the reception section further receives the command packet transmitted from the operation terminal by using electric power acquired from the electric power-supply packet, wherein the command packet acquisition section acquires the command packet from the wireless signal received by the reception section, wherein the electric power-supply packet generation section sequentially generates a plurality of the electric power-supply packets until the command packet is acquired by the command packet acquisition section, and wherein the transmission section sequentially transmits the plurality of the electric power-supply packets generated by the electric power-supply packet generation section to the operation terminal via a wireless signal.

6. The information processing apparatus according to claim 1, further comprising:

a command packet acquisition section; and a processing execution section, wherein the reception section further receives the command packet transmitted from the operation terminal by using electric power acquired from the electric power-supply packet, wherein the command packet acquisition section acquires the command packet from the wireless signal received by the reception section, and wherein the processing execution section executes processing designated by a command included in the command packet acquired by the command packet acquisition section.

7. The information processing apparatus according to claim 6, further comprising:

an electric power-supply determination section to determine whether electric power-resupply request information for indicating retransmission of the electric power-supply packet is added to the command packet acquired by the command packet acquisition section, wherein, when it is determined by the electric power-supply determination section that the electric power-resupply request information is added to the command packet, the electric power-supply packet generation section re-generates the electric power-supply packet, and wherein the transmission section retransmits the electric power-supply packet generated by the electric power-supply packet generation section to the operation terminal via a wireless signal.

8. The information processing apparatus according to claim 6, further comprising:

a storage section; and an electric power-supply determination section to determine whether electric power-resupply request information for indicating retransmission of the electric power-supply packet is added to the command packet acquired by the command packet acquisition section, wherein, when it is determined by the electric power-supply determination section that the electric power-resupply request information is added to the command packet, the electric power-supply packet generation section re-generates the electric power-supply packet, wherein the transmission section retransmits the electric power-supply packet generated by the electric power-supply packet generation section to the operation terminal via a wireless signal, and wherein, when it is determined by the electric power-supply determination section that the electric power-resupply request information is added to the command packet, the processing execution section causes the command included in the command packet acquired by the command packet acquisition section to be stored into the storage section, and when it is determined by the electric power-supply determination section that the electric power-resupply request information is not added to the command packet, the processing execution section obtains a combined command by combining an Nth command, wherein N represents an integer of 2 or more, included in the command packet acquired by the command packet acquisition section with a first command to an N−1th command stored in the storage section and executes processing designated by the obtained combined command.

9. An operation terminal comprising:
an input section to accept input of operation information including a command for designating processing that an information processing apparatus is caused to execute;
a command acquisition section to acquire the command from the operation information the input of which is accepted by the input section;
a trigger packet generation section to generate, when the command is acquired by the command acquisition section, a trigger packet which is a packet smaller than the command packet including the command; and
a transmission section to transmit the trigger packet generated by the trigger packet generation section to the information processing apparatus via a wireless signal.

10. The operation terminal according to claim 9, further comprising:
a reception section to receive a trigger packet reception-notification packet for indicating that the trigger packet is received via a wireless signal, from the information processing apparatus which received the trigger packet via a wireless signal; and
a trigger packet transmission result acquisition section to acquire the trigger packet reception-notification packet from the wireless signal received by the reception section,
wherein the trigger packet generation section sequentially generates a plurality of the trigger packets until the trigger packet reception-notification packet is acquired by the trigger packet transmission result acquisition section, and
wherein the transmission section sequentially transmits the plurality of the trigger packets generated by the trigger packet generation section to the information processing apparatus via a wireless signal.

11. The operation terminal according to claim 9, further comprising:
an electric power-supply packet acquisition section to acquire an electric power-supply packet for supplying electric power from the information processing apparatus which received the trigger packet via a wireless signal;
a capacitor section to acquire electric power from the electric power-supply packet acquired by the electric power-supply packet acquisition section and accumulating the electric power;
an electric power-supply control section to supply the electric power accumulated by the capacitor section to the transmission section; and
a command packet generation section to generate a command packet,
wherein the transmission section further transmits the command packet generated by the command packet generation section by using the electric power supplied from the electric power-supply control section.

12. The operation terminal according to claim 11, further comprising:
a monitor section for monitoring the electric power accumulated in the capacitor section; and
an electric power-supply stop request packet-generation section to generate, when it is determined by the monitor section that the electric power exceeds a predetermined value, an electric power-supply stop request packet for indicating that the transmission of the electric power-supply packet is to be stopped,
wherein the transmission section further transmits the electric power-supply stop request packet generated by the electric power-supply stop request packet-generation section to the information processing apparatus.

13. The operation terminal according to claim 11, wherein, when a plurality of commands are acquired by the command acquisition section and the command packet generation section refers to the plurality of the commands as a first command to an Nth command, wherein N represents an integer of 2 or more, sequentially from the beginning, the command packet generation section adds electric power-resupply request information for indicating retransmission of the electric power-supply packet to the first command to the N−1th command and refers to the first command to the N−1th command added with the electric power-resupply request information as a first command packet to an N−1th command packet, and the command packet generation section does not add the electric power-resupply request information to the Nth command and refers to the Nth command not added with the electric power-resupply request information as an Nth command packet, and
wherein the transmission section sequentially transmits the first command packet to the Nth command packet which are generated by the command packet generation section to the information processing apparatus.

14. The operation terminal according to claim 11,
wherein, when the command packet generation section divides the command into a plurality of commands and refers to the plurality of commands acquired by the division as a first command to an Nth command, wherein N represents an integer of 2 or more, sequentially from the beginning, the command packet generation section adds electric power-resupply request information for indicating retransmission of the electric power-supply packet to the first command to an N−1th command and refers to the first command to the N−1th command added with the electric power-resupply request information as a first command packet to an N−1th command packet, and the command packet generation section does not add the electric power-resupply request information to the Nth command and refers to the Nth command not added with the electric power-resupply request information as an Nth command packet, and
wherein the transmission section sequentially transmits the first command packet to the Nth command packet which are generated by the command packet generation section to the information processing apparatus.

15. The operation terminal according to claim 9, wherein the transmission section transmits the trigger packet to the information processing apparatus via a wireless signal by using at least one of:
electric power acquired from an electric power-supply packet that is transmitted from the information processing apparatus at every predetermined time period,
electric power acquired from a piezoelectric element generated by holding down a button provided to the operation terminal,
electric power acquired by electromagnetic induction,
and electric power acquired from a solar battery.

16. An information processing system comprising an information processing apparatus and an operation terminal,
wherein the operation terminal has
an input section to accept input of operation information including a command for designating processing that the information processing apparatus is caused to execute,
a command acquisition section to acquire the command from the operation information the input of which is accepted by the input section, a trigger packet generation section to generate, when the command is acquired by the command acquisition section, a trigger packet which is a packet smaller than the command packet including the command, and a transmission section to transmit the trigger packet generated by the trigger packet generation section to the information processing apparatus via a wireless signal, and wherein the information processing apparatus has a reception section to receive the trigger packet from the operation terminal via a wireless signal, a trigger packet acquisition section to acquire the trigger packet from the wireless signal received by the reception section, an electric power-supply packet generation section to generate an electric power-supply packet for supplying electric power, when the trigger packet is acquired by the trigger packet acquisition section, and a transmission section for transmitting to transmit the electric power-supply packet generated by the electric power-supply packet generation section to the operation terminal via a wireless signal.

17. An information processing method performed by an information processing system which includes an information processing apparatus having a reception section, a trigger packet acquisition section, an electric power-supply packet generation section, and a transmission section, and an operation terminal having an input section, a command acquisition section, a trigger packet generation section, and a transmission section, the information processing method comprising the acts executed by the operation terminal of:

accepting input of operation information including a command for designating processing that the information processing apparatus is caused to execute, which is performed by the input section;

acquiring the command from the operation information the input of which is accepted by the input section, which is performed by the command acquisition section;

generating, when the command is acquired by the command acquisition section, a trigger packet which is a packet smaller than the command packet including the command, which is performed by the trigger packet generation section; and transmitting the trigger packet generated by the trigger packet generation section to the information processing apparatus via a wireless signal, which is performed by the transmission section, and the information processing method further comprising the acts executed by the information processing apparatus of:

receiving the trigger packet from the operation terminal via a wireless signal, which is performed by the reception section;

acquiring the trigger packet from the wireless signal received by the reception section, which is performed by the trigger packet acquisition section;

generating an electric power-supply packet for supplying electric power, when the trigger packet is acquired by the trigger packet acquisition section, which is performed by the electric power-supply packet generation section; and transmitting the electric power-supply packet generated by the electric power-supply packet generation section to the operation terminal via a wireless signal, which is performed by the transmission section.

* * * * *